United States Patent Office 3,514,665
Patented May 26, 1970

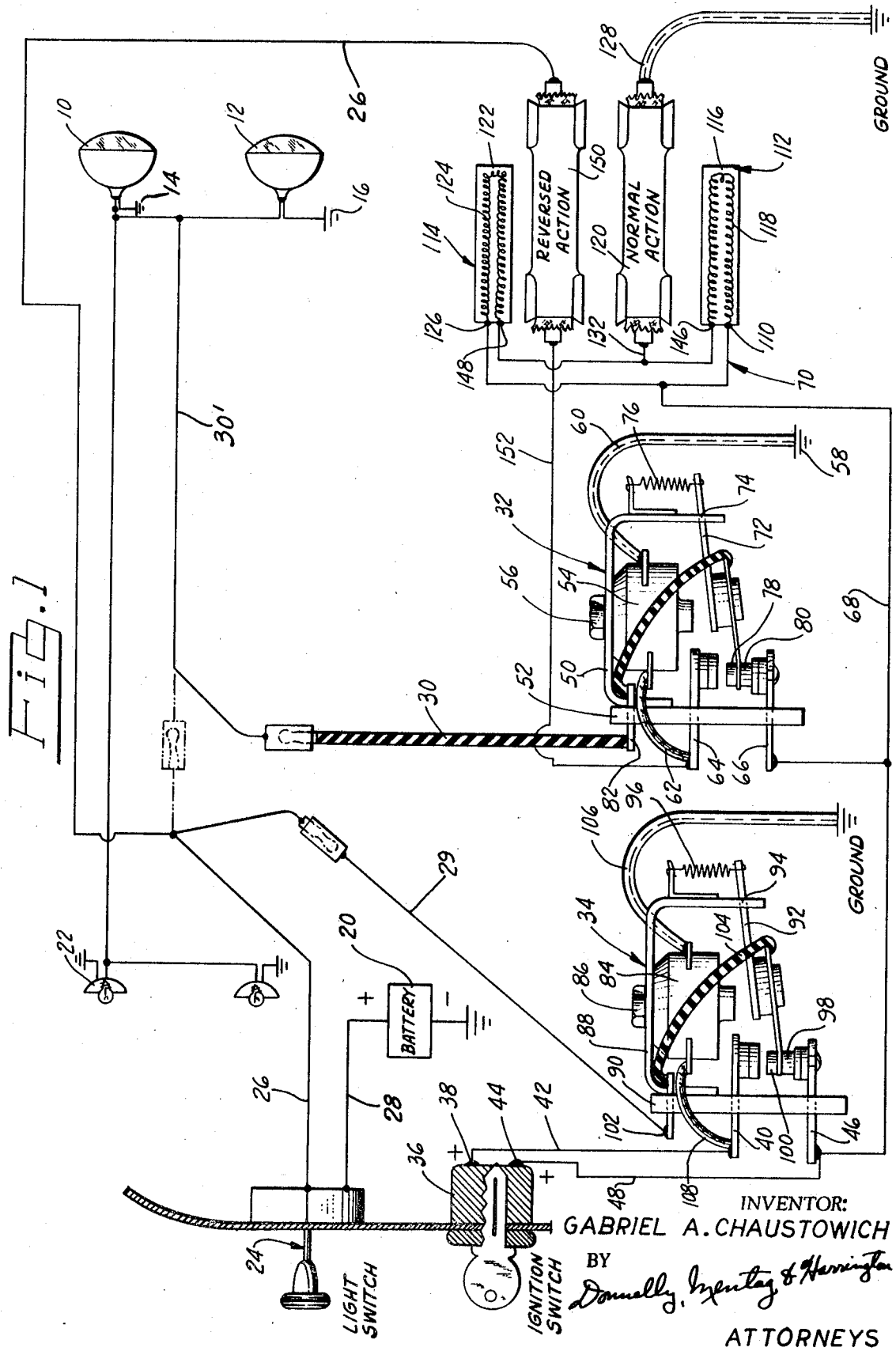

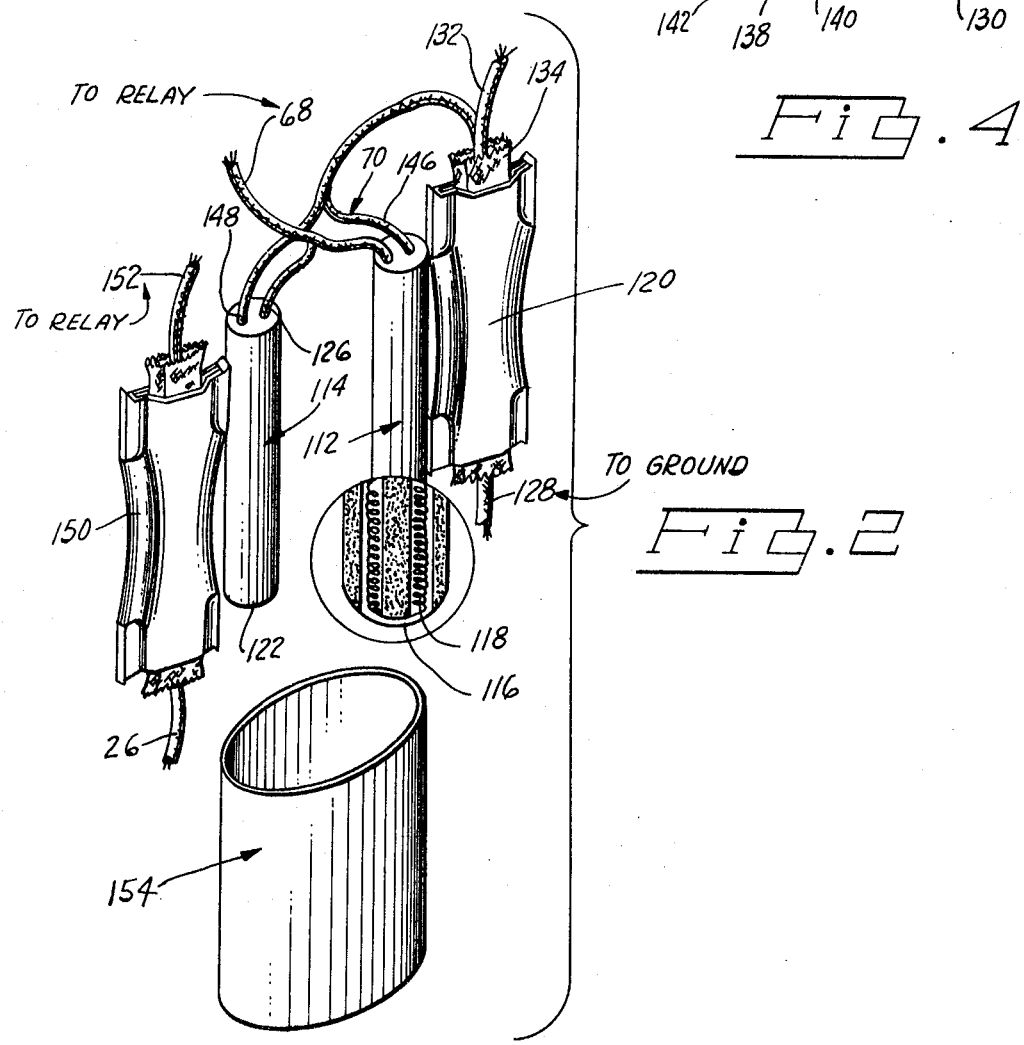

---

3,514,665
DELAY SWITCH CIRCUIT FOR AUTOMOTIVE HEADLAMPS
Gabriel A. Chaustowich, Detroit, Mich., assignor to A. J. Plattner Company, Detroit, Mich., a corporation of Michigan
Filed July 18, 1967, Ser. No. 654,265
Int. Cl. B60q 1/08; H01h 7/06
U.S. Cl. 315—82                    12 Claims

ABSTRACT OF THE DISCLOSURE

This specification describes a lamp circuit adapted especially to be used in the electrical system of an automotive vehicle. It comprises a switch assembly which is adapted to open and close a portion of the vehicle lamp circuit in response to changes in temperature caused by electric heater elements situated in a composite assembly together with thermostatic switch-elements.

A solenoid circuit is used to establish an electrical connection between a driver controlled switch and the headlamps of the vehicle. This same solenoid circuit is connected electrically to thermostatic switch elements. When the switch elements are in an open circuit condition, the lamp circuit is completed through a first set of relay-operated switch contacts. When the thermostatic switch elements are closed, the relay is energized to establish a direct electrical connection through the thermostatic switch elements and through a second set of relay operated switch contacts to the lamps. After the thermostatic switch elements assume a closed circuit condition, the headlamps are extinguished while the ignition system for the vehicle electrical circuit is de-activated. The lamps are extinguished, however, only after a predetermined time delay that is measured by the time required for the temperature of the thermostatic switch elements to fall below a calibrated value.

BRIEF DESCRIPTION OF THE INVENTION

The headlamps in an automotive vehicle are connected electrically to a storage battery and alternator so that they can be energized and deenergized by a dashboard switch situated in the headlamp circuit. It is desirable to introduce a delaying action in the lamp circuit which will allow the lamps to remain energized for a predetermined time interval after the control switch is opened. This will permit the vehicle operator to use the illumination of the headlamps of the vehicle as he parks the vehicle at his destination and walks from the vehicle to the safety of his home or other place of security. The headlamps will then extinguish themselves automatically when the thermal switch temperature is reduced below a calibrated value. The opening of the vehicle engine ignition switch de-energizes the heating coils associated with the thermal switch.

Provision is made for overruling the time delay circuit with the dash mounted switch. In this way the headlamps always may be under the control of the vehicle operator. They can be extinguished and illuminated immediately at the will of the operator without being encumbered by the time delay when it is not needed nor desired. Unless the operator chooses to overrule the time delay switching functions, however, a solenoid operated delay circuit in the system will respond to the thermal action of the thermal switch.

There are two thermal switches situated in the switch assembly. One switch normally is open when the ambient temperature is less than a calibrated value such as 120°. It is this switch which controls the circuit extending from the voltage source to the headlamps. The second switch is normally closed when the ambient temperature is low and is open when the ambient temperature reaches about 135° Fahrenheit. This second switch forms a part of the circuit for heaters that change the temperature of the switches. Thus the heater circuit is opened when the ambient temperature reaches an upper critical value thereby avoiding overheating of the switch assembly.

The upper temperature limit at which the second switch is closed is higher, of course, than the calibrated temperature for the first thermal switch which controls the lamp circuit. Thus the lamp circuit normally will be open through the first thermal switch whenever the ignition switch is closed.

BRIEF DESCRIPTION OF THE FIGURES OF THE DRAWING

FIG. 1 is a schematic view of a delay switch circuit embodying the improvements of my invention;

FIG. 2 is an isometric assembly view of the thermal switch assembly which forms a part of the circuit in FIG. 1;

FIG. 3 is a view of one of the thermal switch elements of the switch assembly of FIG. 2; and, FIG. 4 is a cross section view taken along the plane of section line 4—4 of FIG. 3.

PARTICULAR DESCRIPTION OF THE INVENTION

In FIG. 1 the vehicle headlamps are designated by reference characters 10 and 12. One side of lamp 10 is grounded at 14 and one side of lamp 12 is grounded at 16. The ground may comprise any part of the vehicle that is connected electrically to the vehicle battery ground terminal. The battery is indicated schematically at 20.

The tail lamps 22 for the vehicle are situated in parallel relationship with respect to the lamps 10 and 12. They thus can be operated by the same switch.

A dashboard mounted light switch 24 can be opened and closed by the vehicle operator, thus establishing and disestablishing an electrical connection between electrical conduits 26 and 28. The conduit 28 for switch 24 is connected electrically to the battery 20. Conduit 26 is connected directly to conduit 29. Conduit 29 extends to a relay switch assembly 34.

The relay switch assembly 34, which is of a construction generally similar to that shown at 32, is connected electrically to a vehicle ignition switch 36. Terminal 38 of the switch 36 is connected to a relay contact 40 through conduit 42, and a second terminal 44 is connected to a second relay contact 46 through electrical conduit 48.

Relay switch 32 includes a supporting bracket 50 which is mounted or otherwise secured to a mounting bracket 52. An electrical solenoid coil 54 is secured to the bracket 50. A suitable bolt 56 may be provided for this purpose. One end of the solenoid coil is grounded at 58 through a ground conduit 60. The other end of the solenoid coil 54 is connected by means of a line 62 to relay contact 64 which is carried by the mounting bracket 52. A second relay contact 66 also is carried by mounting bracket 52. It is connected electrically to conduit 68 which extends to the thermal switch assembly indicated generally at 70. Conduit 68 is connected electrically also to contact 46 and to conduit 48.

A movable relay armature 72 is pivoted at 74 on one portion of the bracket 50. Armature 72 is biased normally in a counterclockwise direction by means of armature spring 76 which is anchored as indicated to the bracket 50. One end of the armature 72 carries a pair of contacts 78 and 80. When the armature 72 is in the position shown in FIG. 1, an electrical connection is established between contact 80 and contact 66. Armature 72 is connected electrically to terminal 82 fixed on the bracket 52. This same terminal is connected electrically to the conduit 30.

The relay switch 34 is similar in construction to switch 32. It includes a solenoid coil winding 84 which is secured by bolt 86 to a supporting bracket 88. It is supported by a mounting bracket 90. An armature 92 is pivoted on the bracket 88 at 94. An armature spring 96 is anchored to the bracket 88 and normally biases the armature 92 in a counterclockwise direction to establish a connection between a first contact 98 on the armature 92 and the previously mentioned contact 46. If the armature 92 is moved in a clockwise direction, a second armature contact 100 becomes electrically connected to the contact 40. The armature is connected to terminal 102 by means of lead 104.

One end of the solenoid windings 84 is connected to the ground through a ground line 106. The other end thereof is connected by means of a lead 108 to contact 40.

Conduit 68 is connected to one terminal 110 of a first heater element 112. It is connected also to one terminal of a second heater element 114. Each heater element includes a ceramic case, as shown for example at 116. Case 116 is formed with axially extending openings through which is received a heating coil 118. The second terminal of the coil 118 is connected to a first thermal switch element 120.

Heater element 114 also includes a case of ceramic as shown at 122. A heating coil 124 extends through axially extending openings in the case 122. One terminal 126 of the coil 124 is connected to the conduit 68. The other terminal for the coil 124 is connected to the thermal switch 120.

Switch 120 comprises a case which may be made of aluminum. It is formed with a hollow interior as indicated best in the cross section view of FIG. 4. A first lead 128 is secured within one end of the case 120, by crimping one end of the case 120 on the lead 128 and by enclosing suitable insulating material 130 within the end of the case 120 before it is crimped thereby insulating the lead 128 from the case 120.

A second lead 132 is inserted through the opposite end of the case 120. It also is held in place by crimping the end as indicated. Suitable insulating material 134 is situated between the lead 132 and the case 120.

A suitable lining of asbestos 136 or some other suitable insulator is located in the interior of the case 120. It surrounds the leads 132 and it functions to delay changes in temperature inside the case following corresponding changes in the ambient temperature.

The interior ends of the leads 128 and 132 carry switch contacts 138 and 140. A strip of bimetallic material 142 is located on one side of the lead 132 which also forms the armature for the contact 138. A second strip of bimetallic material 144 is situated on the upper side of the lead 128 which also forms an armature for the switch contact 140.

When the temperature inside the case 120 reaches a calibrated value, the bimetallic strips 142 and 144 will move the contacts 138 and 140 out of registry thereby interrupting the connection between leads 128 and 132.

Lead 128 is connected to the ground. Lead 132 is connected to the remaining terminals 146 and 148 for the heating coils 118 and 124 respectively.

Situated in close proximity to the heating elements 112 and 114 is a second thermal switch 150, the action of which is reversed with respect to the action of switch 120. Its contacts which would correspond to the contacts 138 and 140 in FIG. 4, are open when the ambient temperature is less than a predetermined value, such as 120°. The bimetallic strips cause the contacts to close, however, when the temperature exceeds that calibrated value. In other respects the switch 150 is identical to the switch 120. The reverse action can be accomplished simply by reversing the positions of the thermostatic bimetallic strips which correspond to the strips 142 and 144.

As seen in FIG. 2 the switch assembly comprises two heater elements and two thermal switches surrounded by an aluminum case 154 which acts as a heat sink and which seals a known volume of air for the heater elements.

Switch 150 establishes and disestablishes a connection between the battery 20 and conduit 152 which is connected to contact 64.

The vehicle operator can control the lamp circuits at any time by means of the light switch 24. He thus can overrule the time delay circuit. If he wishes to allow the time delay circuit to deactivate the lamp circuit, however, he may leave the light switch 24 in the "on" position.

If it is assumed that the operator turns the ignition switch to the "on" position, a connection now is established between conduit 48 and conduit 42. Contacts 98 and 100 establish a connection between conduit 42 and the ground through the solenoid windings 84. If switch 24 is "on," this energizes the solenoid relay 34 thereby establishing a connection between contact 100 and terminal 40. Thereafter the relay 34 remains energized by reason of the connection that then is established between conduit 29 and the ground through the solenoid windings 84. A connection is established also between conduit 42 and terminal 102.

If at this time the operator desires to extinguish the lamps, he may simply open the switch 24 thereby interrupting the connection between the terminal battery and the conduit 26.

As conduit 48 becomes energized, a connection is established with the ground through the heaters 112 and 114, conduit 68 providing the connection with each heater. At this time a connection is established between the heaters and the ground through the closed thermal switch 120, and the thermal switch 150 is open. After a predetermined time lapse, the heater 114, acting with the heater 112, will raise the ambient temperature to a value that is of sufficient magnitude to cause the thermal switch 150 to close. This then establishes a connection through switches 24 and 150 between the positive battery terminal and the relay terminal 64. This causes the solenoid windings 54 to become energized thereby moving the armature 72 until contact 78 engages the terminal 64. When this happens the conduit 152 becomes connected directly to the conduit 30 through the armature 72 which is connected to the terminal 82. A parallel connection is now established between conduit 29 and the plus terminal of the battery.

Thus if the vehicle operator should close the switch 24 and then turn the ignition switch to the "off" position, it still will be possible for the lamps to remain illuminated since a parallel connection now is established through the thermal switch 150 with the positive terminal of the battery.

When the ignition switch is turned to the "off" position, conduit 68 is de-energized as the solenoid 84 is deactivated. The ambient temperature of the thermal switches now begins to fall off. When the temperature limit for the switch 150 is reached, the switch opens. This interrupts the circuit for the solenoid winding 54. The armature 72 then moves under the influence of the spring 76, thereby disconnecting the conduit 30 from the battery and the lamps then are extinguished although the lamp switch 24 still is in the closed position.

When the ignition switch is off, it is still possible for the operator to close the lamp circuit by establishing a connection through the light switch 24, through conduit 29, through contact 98, through conduit 68, and through contact 66 to conduit 30. If he wishes to illuminate the lamps when the ignition switch is on but before switch 150 is closed, the necessary connection between conduit 29 and conduit 68 is established through contact 100, switch 36 and conduit 48.

Having thus described a preferred form of my invention, what I claim and desire to secure by U.S. Letters Patent is:

1. A time delay circuit for an electric load, comprising a source of electrical potential, a thermostatic switch, a pair of relay switch contacts, one of said switch contacts being connected to said potential source through said thermostatic switch, an electric heater adjacent said switch for changing the ambient temperature thereof, an electric circuit for said heater connecting said heater with said potential source, a manual switch in said heater circuit for opening and closing the same, said thermostatic switch responding to a change in ambient temperature to open and close a connection between said one relay contact and said voltage source, the second of said relay contacts connected to said heater circuit, a relay armature having formed thereon switch elements that engage alternately said first and second relay contacts, an electric conduit connecting said armature to said load, electric solenoid means for moving said armature, said solenoid windings being connected to one side of said thermostatic switch whereby said solenoid becomes energized as said thermostatic switch becomes closed to establish an electrical connection between said potential source of said armature.

2. A time delay lamp circuit for an automotive vehicle electrical system comprising load in the form of a pair of lamps, a voltage potential source in the form of a storage battery, a thermostatic switch, one side of which is connected to said battery, a heater situated adjacent the thermostatic switch, an ignition switch means for connecting said heater to said battery and for disconnecting the same, an electrical relay assembly comprising a solenoid winding one end of which is connected to the other side of said thermostatic switch, an armature in said relay assembly having a pair of switch contacts, an electric conduit extending to said lamps, said armature being connected to said electric conduit, a second pair of switch contacts one of which is connected to said other side of said thermostatic switch and the other of which is connected to said ignition switch means, said relay assembly and said thermostatic switch establishing a connection between said battery and said lamps when the ambient temperature of said thermostatic switch is greater than a pre-calculated value.

3. The combination as set forth in claim 1 wherein said delay circuit includes a manually controlled switch means situated between said relay contacts and said electric load whereby the time delay action of said delay circuit can be overruled.

4. The combination as set forth in claim 2 wherein said delay circuit includes a manually controlled switch means situated between said relay contacts and said electric load whereby the time delay action of said delay circuit can be overruled.

5. The combination as set forth in claim 3 wherein said delay circuit includes a parallel electrical connection between said potential source and said load and comprising a second relay, said second relay having an armature with switch elements thereon, a pair of second switch elements adapted to engage alternately the elements of said armature, one of said second switch elements being connected to said potential source whereby an electrical connection is established through said armature between said potential source and said load, and a parallel connection between said potential source and said solenoid winding whereby said armature is moved as the connection with the potential source is completed to cause a connection between said armature and the other of said second switch elements to complete a second circuit between said load and said potential source.

6. The combination as set forth in claim 4 wherein said delay circuit includes a parallel electrical connection between said potential source and said load and comprising a second relay, said second relay having an armature with switch elements therein, a pair of second switch elements adapted to engage alternately the elements of said armature, one of said second switch elements being connected to said potential source whereby an electrical connection is established through said armature between said potential source and said load, and a parallel connection between said potential source and said solenoid winding whereby said armature is moved as the connection with the potential source is completed to cause a connection between said armature and the other of said second switch elements to complete a second circuit between said load and said potential source.

7. The combination as set forth in claim 1 wherein said delay circuit includes a second thermoswitch adjacent said heater and forming a part of the electric energizing circuit for said heater, said second thermostatic switch assuming an open circuit condition when the ambient temperature established by said heater exceeds an upper limiting value thereby avoiding overheating of said heater.

8. The combination as set forth in claim 2 wherein said delay circuit includes a second thermoswitch adjacent said heater and forming a part of the electric energizing circuit for said heater, said second thermostatic switch assuming an open circuit condition when the ambient temperature established by said heater exceeds an upper limiting value thereby avoiding overheating of said heater.

9. The combination as set forth in claim 3 wherein said delay circuit includes a second thermoswitch adjacent said heater and forming a part of the electric energizing circuit for said heater, said second thermostatic switch assuming an open circuit condition when the ambient temperature established by said heater exceeds an upper limiting value thereby avoiding overheating of said heater.

10. The combination as set forth in claim 4 wherein said delay circuit includes a second thermoswitch adjacent said heater and forming a part of the electric energizing circuit for said heater, said second thermostatic switch assuming an open circuit condition when the ambient temperature established by said heater exceeds an upper limiting value thereby avoiding overheating of said heater.

11. The combination as set forth in claim 5 wherein said delay circuit includes a second thermoswitch adjacent said heater and forming a part of the electric energizing circuit for said heater, said second thermostatic switch assuming an open circuit condition when the ambient temperature established by said heater exceeds an upper limiting value thereby avoiding overheating of said heater.

12. The combination as set forth in claim 6 wherein said delay circuit includes a second thermoswitch adjacent said heater and forming a part of the electric energizing circuit for said heater, said second thermostatic switch assuming an open circuit condition when the ambient temperature established by said heater exceeds an upper limiting value thereby avoiding overheating of said heater.

References Cited

UNITED STATES PATENTS

| | | | |
|---|---|---|---|
| 2,423,316 | 7/1947 | Holmes | 317—141 |
| 3,244,899 | 4/1966 | Merle | 315—82 X |

JAMES W. LAWRENCE, Primary Examiner

E. R. LA ROCHE, Assistant Examiner

U.S. Cl. X.R.

307—10; 317—141